US006438797B1

(12) United States Patent
Thomas

(10) Patent No.: US 6,438,797 B1
(45) Date of Patent: Aug. 27, 2002

(54) MOP HANDLE WITH IMPROVED WATER FLOW CONTROL

(75) Inventor: Paul Bruce Thomas, San Pedro, CA (US)

(73) Assignee: Carrand Companies, Inc., Compton, CA (US)

( * ) Notice: Subject to any disclaimer, the term of this patent is extended or adjusted under 35 U.S.C. 154(b) by 0 days.

(21) Appl. No.: 09/808,079

(22) Filed: Mar. 15, 2001

(51) Int. Cl.[7] .......................... A47J 45/00; A46B 11/04
(52) U.S. Cl. ................ 16/110.1; 16/DIG. 41; 16/900; 401/270
(58) Field of Search .................. 16/436, 110.1, 16/429, 331, 332, 334, 900, DIG. 41; 401/270, 268, 263, 219, 205, 41–47

(56) References Cited

U.S. PATENT DOCUMENTS

| | | | | | |
|---|---|---|---|---|---|
| 1,832,811 | A | * | 11/1931 | Jowett | .......................... 16/436 |
| 2,613,381 | A | * | 10/1952 | Tucker | .......................... 401/43 |
| 2,636,204 | A | * | 4/1953 | Soss | ............................ 15/231 |
| 3,271,809 | A | * | 9/1966 | Morawski | ................... 239/318 |
| 4,461,052 | A | * | 7/1984 | Mostul | .................. 137/625.13 |
| 4,673,307 | A | * | 6/1987 | Prestele et al. | ............. 15/144.1 |
| 4,674,904 | A | * | 6/1987 | Buck | ......................... 137/513.5 |
| 6,220,527 | B1 | * | 4/2001 | Chen et al. | .................. 239/532 |

* cited by examiner

Primary Examiner—Anthony Knight
Assistant Examiner—Vishal Patel
(74) Attorney, Agent, or Firm—George R. McGuire; Hancock & Estabrook, LLP

(57) ABSTRACT

A handle for a mop or other such cleaning instrument is hollow for flow of water from a hose attached to one end of the handle to the work-engaging portion at the other end. A manually operable control moves a stopper between three positions wherein flow through an opening in an internal partition in the handle is fully blocked, partially blocked or fully unblocked. The stopper has a total of three detent members in the form of rounded protrusions and a total of three recess for receiving the detents are formed in the partition. As the operating member is manipulated to move the stopper between its three positions, one detent engages a recess in the fully blocked position, two detents engage respective recesses in the partially blocked position and all three detents engage the three recesses in the fully unblocking position. The provision of three detents and three recesses adds to the stability and reliability of operation of the implement.

5 Claims, 6 Drawing Sheets

MOP HANDLE WITH IMPROVED WATER FLOW CONTROL

BACKGROUND OF THE INVENTION

The present invention relates to mop handles, and more particularly to structure for improving control of water flow through a hollow mop handle. It will be understood that the term "mop" is used herein to denote any hand-held cleaning implement having, or for attachment to, a work engaging portion.

For quite some time, mop handles have been provided in hollow form for connecting a hose, or the like, to the mop rod or scrubbing portion of the mop. Some such mop handles have included a manually operable control mechanism for selective movement between two (on/off) or three (on/half-on/off) positions. In prior art three-position controls, the center (half-on) position was often unstable, requiring careful manipulation by the operator to ensure proper engagement of a detent on the stopper with a recess in the handle body. The object of the present invention is to provide apparatus for improving stability of a flow-control mechanism in mop handles equipped for flow of water or other liquids therethrough.

SUMMARY OF THE INVENTION

Prior art mop handles, as will be described in connection with the drawings, have included mechanism for controlling flow of water through the hollow, holding portion of the handle by means of a rotatable stopper having a pair of detents in the form of rounded protrusions. A partition in the handle included a pair of recesses for engagement by the detents and a flow opening which could be completely or partially blocked by the stopper, or completely unblocked (fully open), depending upon the selected position of the stopper. In the completely blocked or closed position, the stopper engaged a resilient gasket surounding the flow opening and neither of the detents on the stopper engaged a recess; in the half-on position one of the detents engaged a recess, and in the fully open position both detents engaged respective recesses.

In the mop handle of the present invention, a third detent is added to the stopper, and a third recess is provided in the internal partition in the body of the handle. When the stopper is in the fully blocking (closed) position, the added detent is engaged in one of the recesses. In the half-open position the added detent and one of the other detents are engaged in two of the recesses, and in the fully open position all three detents are engaged in the three recesses. This structure provides more stable and accurate positioning of the flow-control member, thereby ensuring the desired operation.

The foregoing and other features of construction and operation of the mop handle flow control of the invention will be more readily understood and fully appreciated from the following detailed disclosure, taken in conjunction with the accompanying drawings.

DETAILED DESCRIPTION

Figure 1:
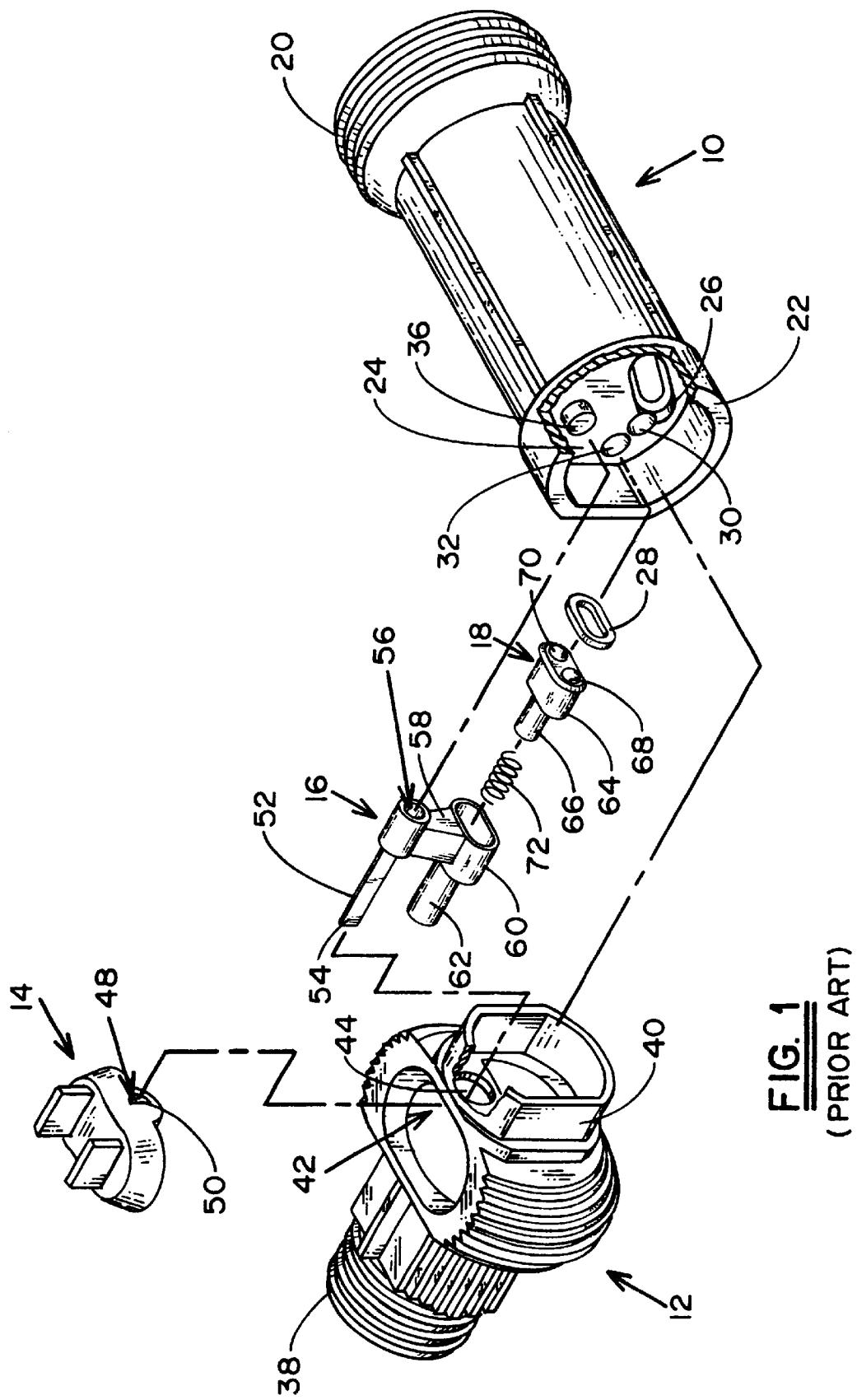
FIG. 1 is an exploded perspective view of a prior art mop handle with flow control.
Figure 2:
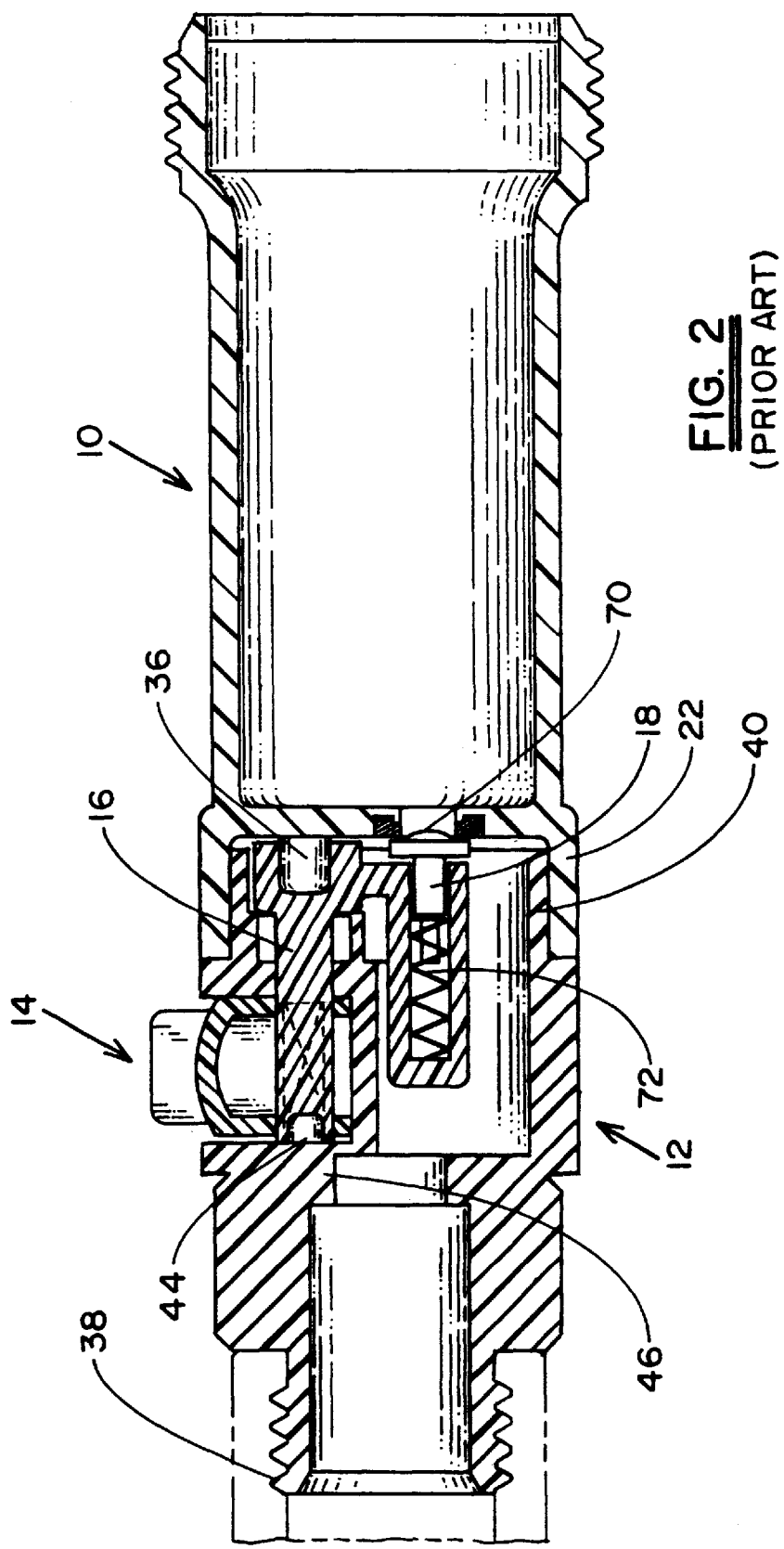
FIG. 2 is a side elevational view, in full section, of the mop handle of FIG. 1.
Figure 3:
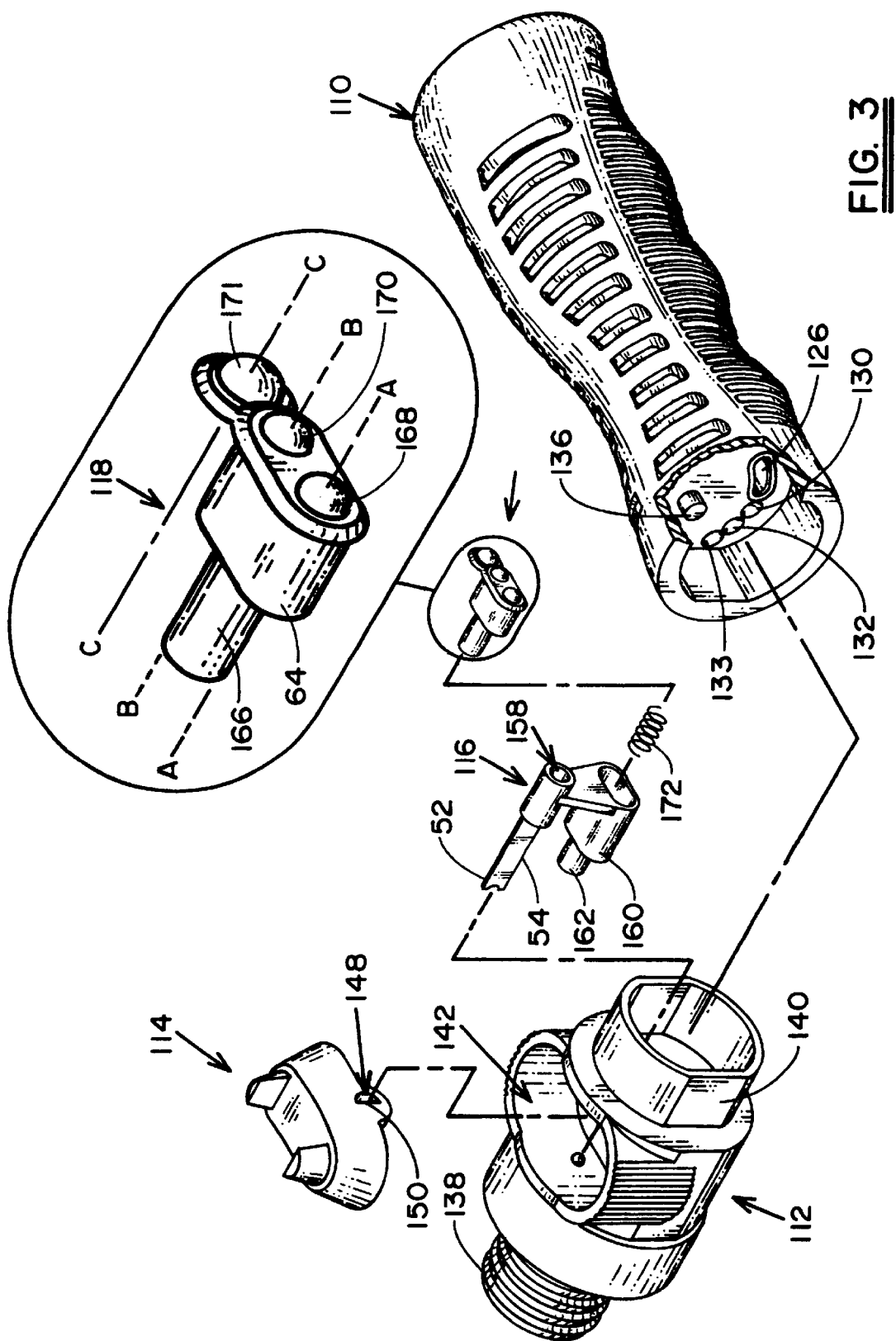
FIG. 3 is an exploded perspective view of the mop handle of the present invention, with a portion shown in enlarged form.
Figure 4:
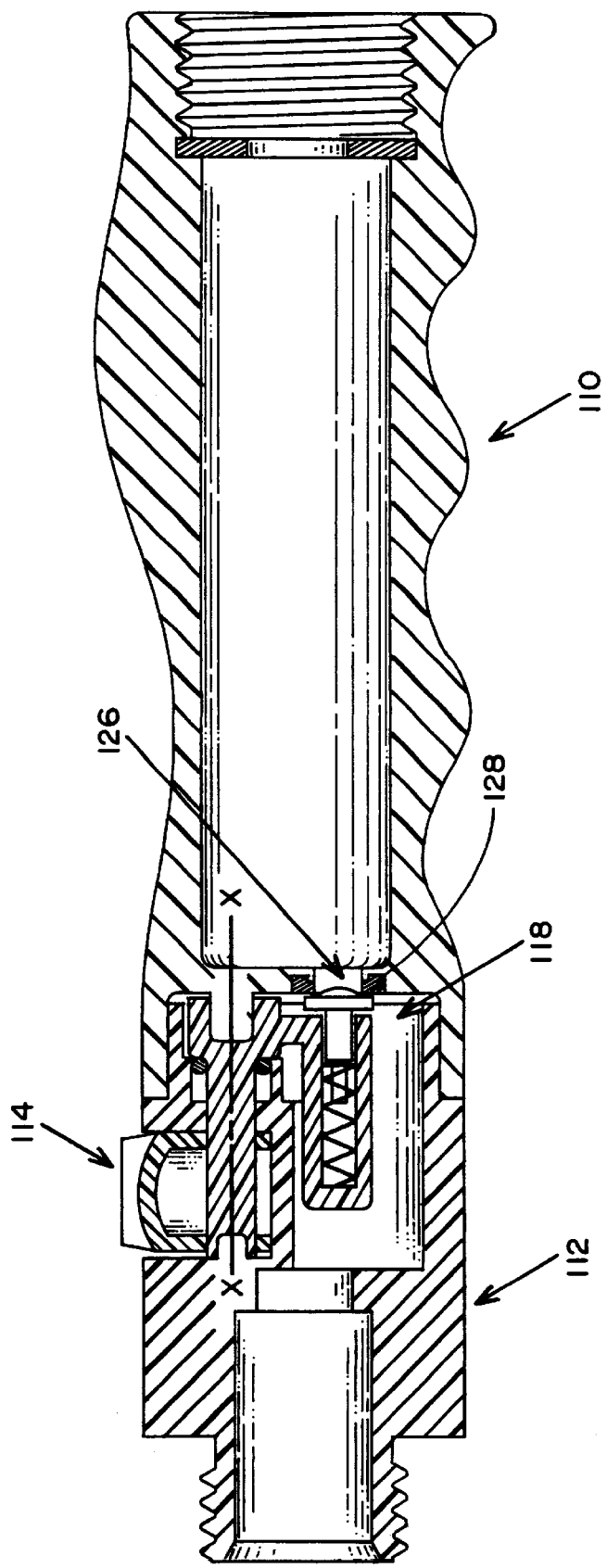
FIG. 4 is a side elevational view, in full section, of the mop handle of FIG. 3.

The prior art mop handle of FIGS. 1 and 2 includes portion 10 for manually grasping and holding the implement, joint 12, operating member 14, frame member 16 and stopper 18. Holding portion 10 is hollow, having external threads 20 and flange 22 at opposite ends and internal partition 24 surrounded by the flange. Flow opening 26, surrounded by resilient gasket 28, extends through partition 24; recesses 30 and 32 are formed in, and stub shaft 36 extends from, the partition. Joint 12 is also hollow, having threads 38 and flange 40 at opposite ends and enlarged, radial opening 42; stub shaft 44 extends from wall 46 within opening 42. Operating member 14 is in the form of a rotatable rocker, having opening 48 with flat side 50 in a lower, central portion thereof. Frame member 16 includes stem 52 having flat side 54, opening 56 in one end and a similar, axial opening in the other end. Stem 52 is connected by member 58 to sleeve 60, from which hollow, cylindrical portion 62 integrally extends. Stopper 18 comprises integral body and stem portions 64 and 66, respectively, and a pair of detents 68, 70 in the form of rounded protrusions.

The handle of FIGS. 1 and 2 is assembled by placing operating member 14 in opening 42 to rest upon a supporting wall portion ofjoint 12, with stub shaft 44 extending into opening 48. Frame member 16 is inserted into the open end of joint 12 surrounded by flange 40, with stem 52 extending through opening 48 and stub shaft 44 extending into the opening in the end of stem 52. Spring 72 is inserted into portion 62 of frame member 16, and body portion 64 of stopper 18 is inserted in sleeve 60, with stem portion 66 of stopper 18 extending into spring 72. Holding portion 10 and joint 12 are then mutually assembled by means of mating flanges 22 and 40. In this position, as seen in FIG. 2, stub shafts 36 and 44 extend into opposite ends of stem 52, providing a fixed axis X-X of rotation for frame 16. As operating member 14 is manually rocked on its support, frame 16 is rotated due to the engagement of flat sides 50 and 54. Sleeve 60 and thus stopper 18 are moved in an arcuate path about the axis of rotation X-X of frame 16 in response to manual manipulation of operating member 14 and resulting rotation of frame 16. Stopper 18 is biased by spring 72 toward partition 24, whereby recesses 30 and 32, and detents 68 and 70, together with stopper 18 and flow opening 26, define three distinct positions for stopper 18. The flow opening may be completely blocked by the stopper, with neither of detents 68, 70 engaged in any recess; the flow opening may be partially blocked (half-open) with detent 68 engaged in recess 32, or the flow opening may be entirely unblocked (fully open) with detents 68 and 70 engaging recesses 30 and 32, respectively.

Turning now to FIGS. 3–8, the mop handle of the present invention will be described. Common reference numerals will be used to denote elements which are essentially identical in the illustrated embodiments of the prior art and the present invention with a prefix "1" used in FIGS. 3–8. The same basic group of elements present in the prior art handle, namely, holding portion 110, joint 112, operating member 114, frame 116 and stopper 118, are included in the handle of the present invention. Holding portion 110 includes threads 120, flange 122, internal partition 124, flow opening 126, gasket 128, and recesses 130 and 132, as in the prior art. In addition, recess 133 is formed in partition 124 to the left (as viewed in FIG. 5) of recess 130. Joint 112, operating member 114 and frame 116 are essentially identical to the corresponding parts of the prior art handle and are therefore not described again. Stopper 118 includes body and stem portions 164 and 166, respectively, and detents 168 and 170 of the prior art handle. In addition, stopper 118 includes rounded detent 171, formed integrally with body portion 164 and extending outwardly therefrom. Detents 168, 170 and 171 are in the form of rounded protrusions having respective, central axes A-A, B-B and C-C equally spaced along an arc centered at fixed axis X-X.

Figure 7:
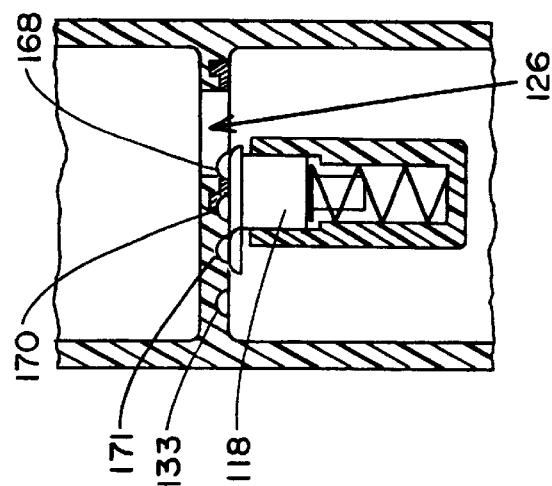
FIGS. 6 and 7 are top plan views in section on the line 6—6 of FIG. 5, also showing the stop member in engagement with the body portion.
Figure 6:
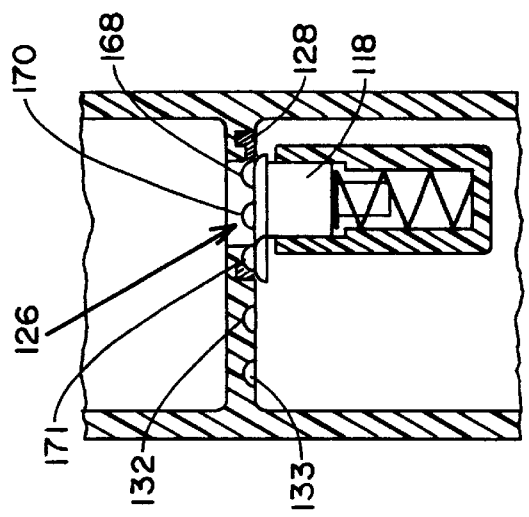
Figure 5:
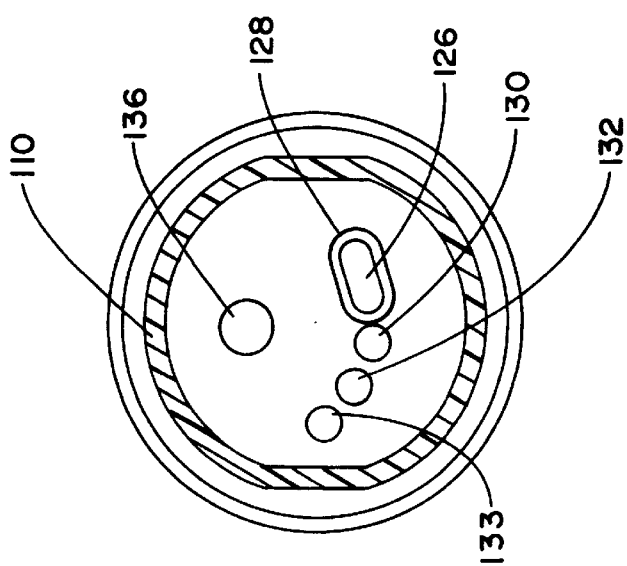
FIG. 5 is a front elevational view of the body portion of the mop handle of FIGS. 3 and 4.
Figure 8:
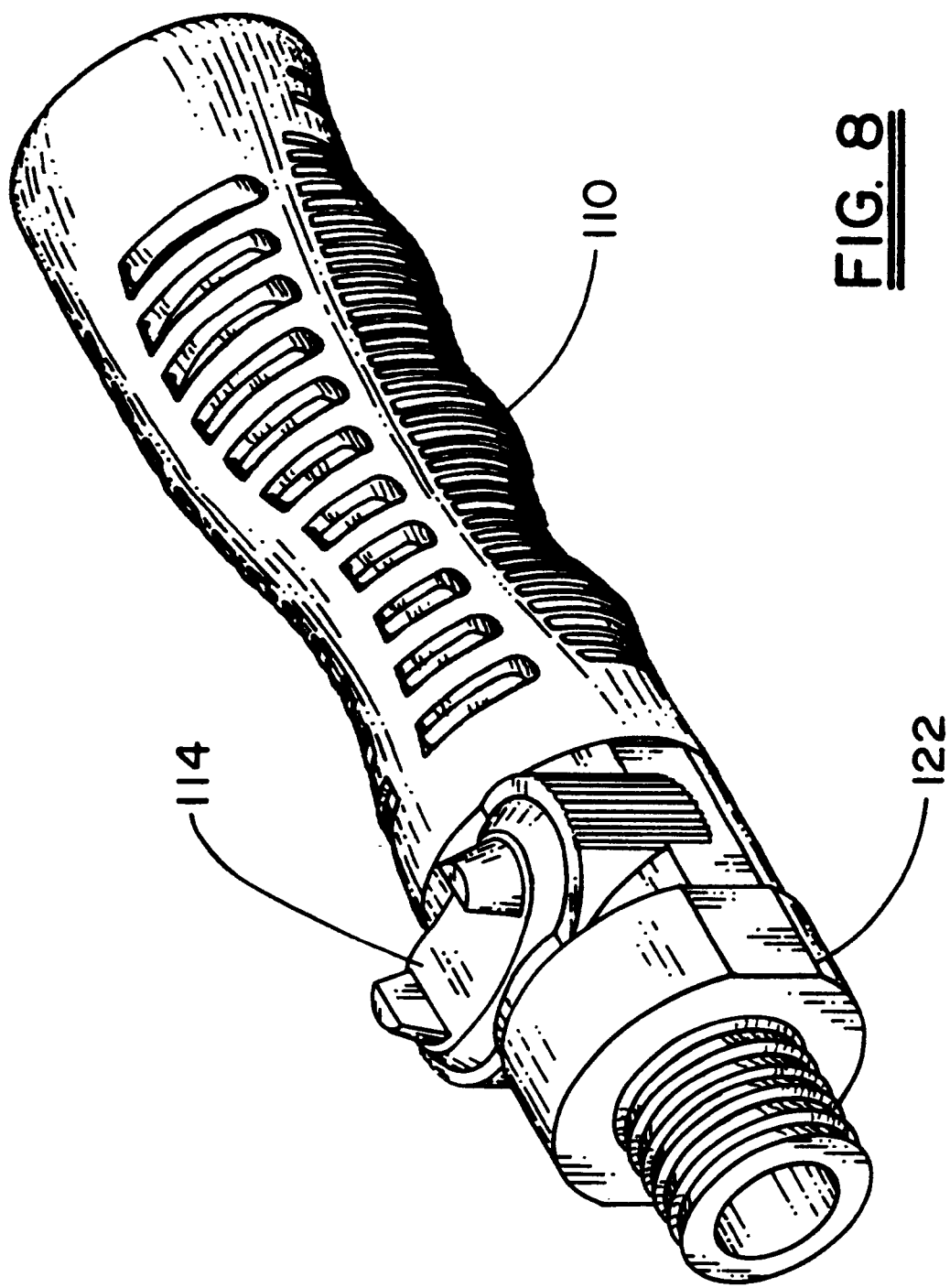
FIG. 8 is a perspective view of the fully assembled mop handle of the invention.

Assembly is the same for both the handles of the prior art and the present invention. As seen in FIG. 6, when stopper 118 is positioned to fully block flow through opening 126, detent 171 is engaged in recess 132. When operating member 114 is manipulated to move stopper 118 to the half-open position, as seen in FIG. 7, both detents 170 and 171 are engaged in recesses 132 and 130, respectively. In the fully open position of stopper 118 (not shown) detents 170, 172 and 173 are engaged in recesses 132, 130 and 133, respectively. The addition of detent 173 and recess 133 provide a much more stable and positive engagement of the stopper in its three distinct positions, thereby contributing to more reliable flow control and operation of the mop handle.

What is claimed is:

1. A hollow mop handle having a holding portion with an internal partition having an opening for flow of liquid through said holding portion, a stopper selectively movable between three distinct positions wherein said stopper fully blocks, partially blocks, and fully unblocks flow through said opening, respectively, and manually operable means for effecting movement of said stopper between said three positions, comprising:
    a) a total of three detent portions having spaced, parallel axes extending from said stopper; and
    b) a total of three recesses formed in said internal partition, said recesses being cooperatively shaped and spaced to receive said detent portions as said stopper is moved between said three positions, a first of said detents being engaged in a first of said recesses when said stopper fully blocks said opening, a said first and a second of said detents being engaged in a second and in said first recess, respectively, when said stopper partially blocks said opening, and said first and second and a third of said detents being engaged in a third and in said first and second recesses, respectively, when said stopper fully unblocks said opening.

2. The mop handle of claim 1 wherein said stopper includes a body portion having a forward surface with a periphery corresponding to the outline of said opening, said first and second detents extending forwardly from said forward surface, inside said periphery, and said third detent positioned laterally of said forward surface, outside said periphery.

3. The mop handle of claim 2 wherein said third detent is formed integrally with said body portion.

4. The mop handle of claim 3 wherein said stopper is rotated about a fixed axis in moving between said three positions and said detent axes and said recesses are spaced along an arc centered at said fixed axis.

5. The mop handle of claim 4 wherein said detents are in the form of rounded protrusions and said recesses are concave, rounded indents in the surface of said internal partition.

* * * * *